S. D. WILLIAMS & H. C. SANDERS.
BREAD AND BUTTER CUTTING MACHINE.
APPLICATION FILED MAR. 13, 1913.

1,070,217.  Patented Aug. 12, 1913.

WITNESSES
Edmund R. Whitman
E. G. McGee

Inventors:
Samuel Dickinson Williams
and
Harold Curtice Sanders
By Emil Ronnelycke
Attorney

UNITED STATES PATENT OFFICE.

SAMUEL D. WILLIAMS AND HAROLD CURTICE SANDERS, OF NEWPORT, ENGLAND.

BREAD AND BUTTER CUTTING MACHINE.

1,070,217. Specification of Letters Patent. Patented Aug. 12, 1913.

Application filed March 13, 1913. Serial No. 754,020.

*To all whom it may concern:*

Be it known that we, SAMUEL DICKINSON WILLIAMS and HAROLD CURTICE SANDERS, subjects of the King of Great Britain and Ireland, and residing at Newport, in the county of Monmouth, England, have invented certain new and useful Improvements in Bread and Butter Cutting Machines, of which the following is a specification.

This invention relates to a machine for producing by continuous motion slices of bread cut off from a loaf and automatically buttered.

According to the present invention the loaf is placed on a carriage having a reciprocating motion, which, at one end of its travel, is in line with a receptacle containing butter and at the other end with a blade which severs the buttered slices from the loaf.

Figure 1:
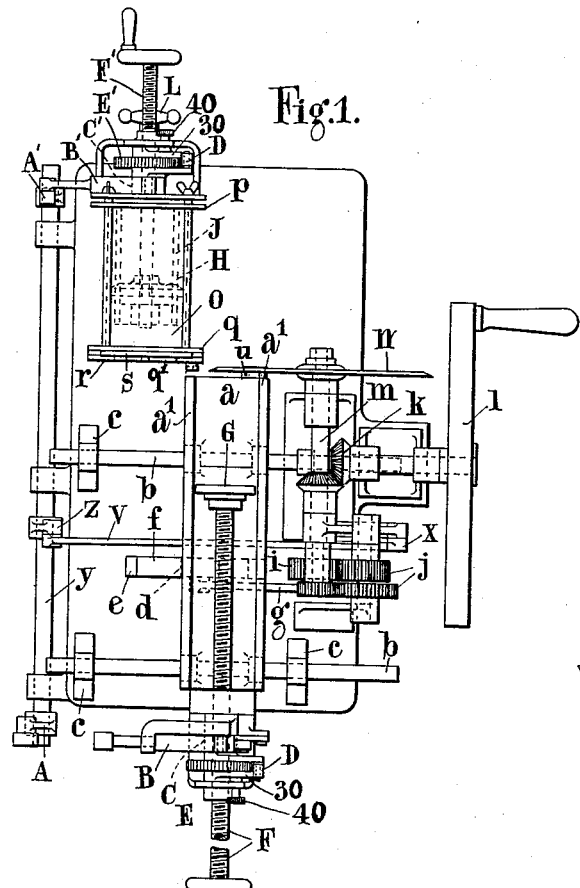
Figure 3:
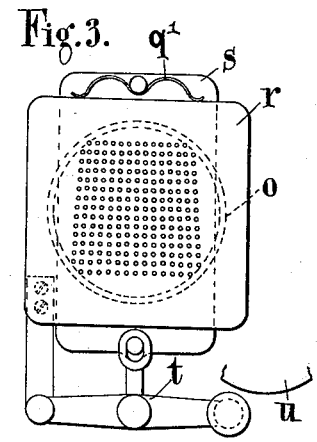
Figure 4A:
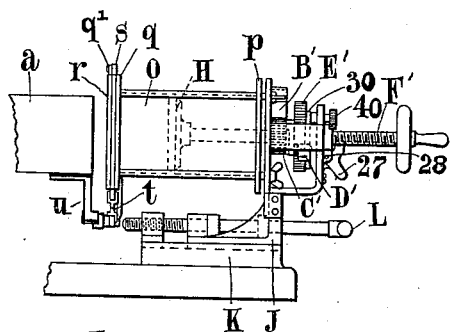
Figure 2:
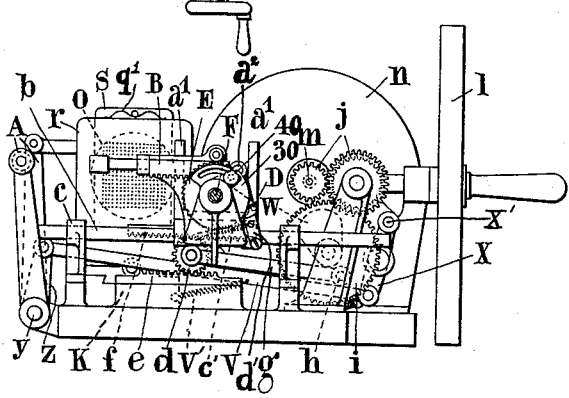
Figure 4:
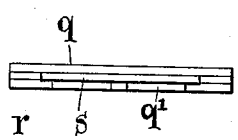

Referring to the accompanying drawings, Figure 1 is a plan, and Fig. 2 a side elevation of the machine; Figs. 3 and 4 show details of the butter receptacle; Fig. 4ª is a side elevation of the butter-receptacle and its operating mechanism.

In the form of the invention illustrated in the drawings, the loaf is held in the carriage $a$ with side flanges $a'$ which is mounted on rails $b$. These rails are attached to the underside of the carriage and slide to and fro through brackets $c$. A reciprocal motion is given to the carriage in a direction at right angles to its length by means of a rack and pinion mechanism. The pinion $d$ meshes with the stationary rack $e$ and the rack $f$ which is attached to the underside of the carriage. The pinion is connected by a link $g$ with crank pin $h$ in the gear $i$. This latter in one revolution thus gives the carriage its required movement which is approximately twice that of the pinion. The gear $i$ is rotated through other suitable gearing $j$ and $k$ by the hand wheel $l$, or by pulleys (not shown), should the machine be driven by power. On spindle $m$ is mounted a circular blade $n$. In line with the length of the loaf and opposite the end of it which is to be cut is a cylinder or other receptacle $o$ for containing the butter, and the term "butter" herein is to be understood to include margarin, drippings, jam, or other matter which it may be desired to spread on the slices of bread to be cut. This cylinder, which may be of any suitable material, preferably of glass, is fitted with a plate at each end, the back one $p$ having a hole in it equal in size to the bore of the cylinder to which it acts as a frame, and the other front one $q$ having a number of perforations through which the butter may be squeezed. This front plate $q$ is fitted with a duplicate $r$ and a sliding plate or valve $s$, all three bearing coincident perforations, so that a slight movement of the valve $s$ takes the holes out of coincidence when it is required to shut off the butter supply or otherwise to regulate the same. This slide or valve $s$ is operated by the link motion $t$ which is in turn operated by a portion $u$ of the carriage, which, as it comes into contact with the stud as indicated, depresses it against a spring $q'$, and pulls down the slide, with the effect as stated; that on the carriage receding the spring restores the slide.

The method of feeding forward the loaf and of pressing the butter through the perforations in the plate $q$ is as follows:—A connecting rod $v$, which is operated by cam $w$ and lever $x$ oscillates a shaft $y$ by means of lever $z$, said lever $x$ being pivoted on the machine frame at $x'$. A spring $v'$ tends to return lever $v$ to normal position after each reciprocation. For convenience the shaft $y$ operates both loaf and butter feeds simultaneously, although each may be arranged to work separately if desired. The levers A and A' oscillated by shaft $y$ impart a reciprocating motion to the racks B and B', which mesh with pinions C and C'. Pivotally attached at $a^2$ to arms carried by the pinions C and C' are ratchet arms $d'$ carrying pawls D and D' respectively. The ratchet wheels E and E' which are turned by the pawls D and D' are screwed to fit rods F and F', which rods, being prevented from rotating by means of spring catches 27 carried on the machine frame at 28 and engaging keyways or slots in rods F and F', are consequently given a movement in the direction of their axes. Spring $e'$ keeps pawls D engaged with the ratchet wheel E, except when the cam 30 prevents such action, as hereinafter set forth. Attached to the bread feed rod is a plate G which presses against the back end of the loaf. The front end of the butter-feed rod is fitted with a piston and cup-leather H or other device for insuring a definite feed. The feed mechanism of both loaf and butter is arranged to operate while the carriage $a$ is in its extreme back position, that is, in line with the butter cylinder. At this point also the slide or valve $s$ is opened so as to allow of the free passage of the butter through the perforated plate $q$.

In the form of the invention now described, the bread feed and the butter feed are actuated by pawls and ratchets on respective screw shafts, as described, and the operator can determine the number of teeth in which the pawls respectively work. In order to effect this, the pawl D may be made inoperative for a certain portion of its travel by riding on the cam surface 30, which is adjustable about a screw F, and can be fixed in any desired position by a thumbscrew 40. By this means the extent of feed of either bread or butter, or both may be varied or regulated at will, with the proviso that if the bread feed is to be increased the butter receptacle is to be retreated, the following mechanism enabling this to be done:—The butter receptacle is mounted on a sliding base J traveling in a suitable grooved plate K arranged in bearings thereon; by means of the motion imparted by a screw shaft the position of the butter receptacle is capable of being set by hand by the handle L on the end of the said screw shaft, and it is thus that the position of the cylinder itself in relation to the distance of the perforated end $q$ from the line of the knife is determined by the thickness of the slice to be cut.

Having now described our invention, what we claim as new and desire to secure by Letters Patent is:—

1. A machine for buttering and cutting slices of bread comprising in combination, a rotary knife, driving means for said knife, a butter container mounted adjacent said knife, means for feeding butter from said container, a movable bread carrier adapted to reciprocate from said butter container to said knife, means for feeding the bread forward step by step in said carrier and means actuated by said driving means for simultaneously actuating said butter and bread feeding means.

2. A machine for buttering and cutting slices of bread comprising in combination, a rotary knife, a butter container adjacent said knife, a bread carrier adapted to move from said butter container to said knife, butter feeding means, means for feeding bread forward in said carrier, means for simultaneously actuating the butter feeding means and the bread feeding means, driving mechanism for said knife and for said butter and bread feeding actuating means, and means controlled by movement of said bread carrier for permitting the emission of a quantity of butter from said butter container.

3. A machine for buttering and cutting slices of bread comprising in combination, a knife, means for actuating said knife, a butter container adjacent the edge of said knife, a movable bread carrier adapted to be brought into alinement with said butter container in one of its positions and to move transversely therefrom to said knife, means for feeding the butter in said container, means for feeding the bread in said carrier, a common means for simultaneously actuating said bread and butter feeding means, and means controlled by the movement of said bread carrier and adapted to permit the emission of a quantity of the butter fed by said container when said carrier is in alinement with the latter.

4. A machine for buttering and cutting slices of bread comprising in combination, a knife, means for actuating said knife, a butter container adjacent the edge of said knife, a transversely reciprocatory bread carrier adapted to be brought into alinement with said butter container in one of its positions, means for feeding butter from said container, means for feeding bread in said carrier, means controlled by said carrier for permitting the emission of a quantity of butter fed from said container, and means for simultaneously actuating said bread and butter feeding means when said means for permitting the emission of butter is actuated.

In testimony whereof we have signed our names to this specification in the presence of two subscribing witnesses.

SAMUEL D. WILLIAMS.
HAROLD CURTICE SANDERS.

Witnesses:
 ELSIE M. WILLIAMS,
 ALBERT S. PHILLIPS.

---

Copies of this patent may be obtained for five cents each, by addressing the "Commissioner of Patents, Washington, D. C."